(12) United States Patent
Maceo et al.

(10) Patent No.: US 6,661,376 B2
(45) Date of Patent: Dec. 9, 2003

(54) TILED ANTENNA WITH OVERLAPPING SUBARRAYS

(75) Inventors: Christine Maceo, Annapolis, MD (US); John Wojtowicz, Hampstead, MD (US); Daniel Boeringer, Silver Spring, MD (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 10/050,822

(22) Filed: Jan. 18, 2002

(65) Prior Publication Data

US 2003/0160720 A1 Aug. 28, 2003

(51) Int. Cl.$^7$ .............................. H01Q 3/22; H01Q 3/24; H01Q 3/26
(52) U.S. Cl. ................. 342/373; 342/368; 343/700 MS
(58) Field of Search ................................ 342/373, 368; 343/700 MS (56) References Cited

U.S. PATENT DOCUMENTS

| | | | |
|---|---|---|---|
| 4,980,925 A | | 12/1990 | Blustine et al. |
| 6,008,775 A | | 12/1999 | Bobowicz et al. |
| 6,559,797 B1 | * | 5/2003 | Chang ........................ 342/368 |

FOREIGN PATENT DOCUMENTS

EP          0 619 622 A2    10/1994

OTHER PUBLICATIONS

"Optimum Beamformers for Monopulse Angle Estimation Using Overlapping Subarrays", IEEE Transactions on Antennas and Propagation, Ta–Sung Lee and Tser–Ya–Dai, 42 (1994) May, No. 5, New York, New York, pp. 651–657.

"An Overlapped Subarray for Limited Scan Application", Robert J. Mailloux, IEEE Transactions on Antennas and Propagation, May, 1974.

"Constrained Feeds for Limited Scan Arrays, Edward C. DuFort, IEEE Transactions on Antennas and Propagation", vol. AP–26, No. 3, May, 1978.

"Design of Monopulse Antenna Difference Patterns with Low Sidelobes", E.T. Bayliss, The Bell System Technical Journal, May–Jun., 1968, pp. 623–650.

Monopulse Networks for Series Feeding an Aray Antenna, Alfred R. Lopez, IEEE Transactins on Antennas and Propagation, vol. AP–16, No. 4, Jul., 1968.

* cited by examiner

Primary Examiner—Theodore M. Blum
(74) Attorney, Agent, or Firm—Birch, Stewart, Kolasch & Birch, LLP (57) ABSTRACT

An antenna having a tiled architecture with overlapping subarray in two dimensions is disclosed. Each tile has two orthogonal ports and there is no physical interconnection between adjacent tiles. The outputs are coupled to individual receivers. The outputs of ports from n adjacent tiles are digitally combined to form an overlapping subarray.

17 Claims, 13 Drawing Sheets

TILED ANTENNA WITH OVERLAPPING SUBARRAYS

BACKGROUND OF THE INVENTION

1. Field of the Invention

This invention relates generally to phased array antennas and more particularly to an antenna configuration with tiled overlapping subarrays.

2. Description of Related Art

Figure 12:
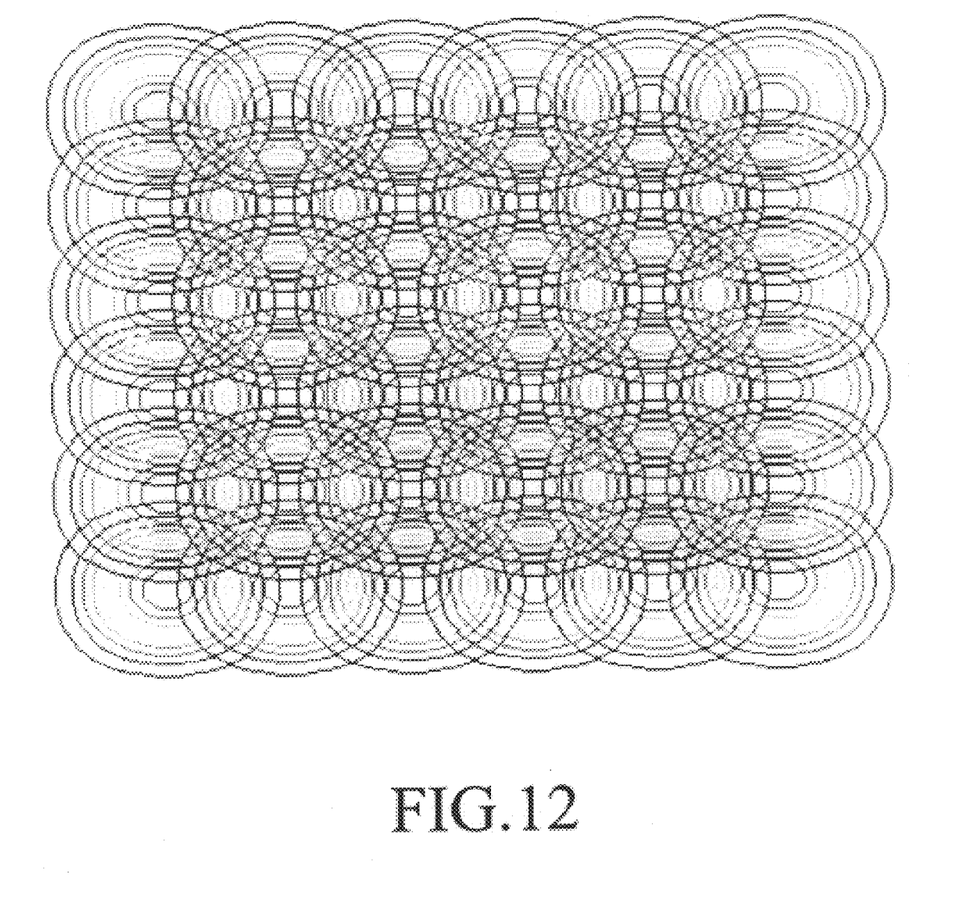
FIG. 12 is illustrative of two-dimensional, 2:1 overlapped subarrays.

The use of overlapped subarrays (OLSAs) to generate multiple simultaneous receive beams and to effect time delay networks for wide instantaneous bandwidth applications is well known in the art. A representation of this architecture is shown in FIG. 12. The preferred filter function to simultaneously steer the antenna beam and avoid grating lobes is a gate function. The farfield radiation pattern of a truncated sinc weighting function applied to a subarray approximates the gate function in the far field. The implementation of OLSAs in an antenna dictates a tiled architecture. An article by R. Mailloux, "An Overlapped Subarray for Limited Scan Application", IEEE Transactions on Antennas and Propagation, May 1974, which is hereby incorporated by reference in its entirety, describes a technique for producing an OLSA pattern for one plane.

Traditionally, for a 2 dimensional (2D), 2:1 overlapped subarray antenna, the beams from four adjacent tiles are combined with analog and/or digital devices to form one 2D OLSA. An article by E. DuFort, "Constrained Feeds for Limited Scan Arrays", IEEE Transactions on Antennas and Propagation, Vol. AP-26, No. 3, May 1978, describes beamforming techniques for OLSAs, which is hereby incorporated by reference in its entirety.

Figure 13:
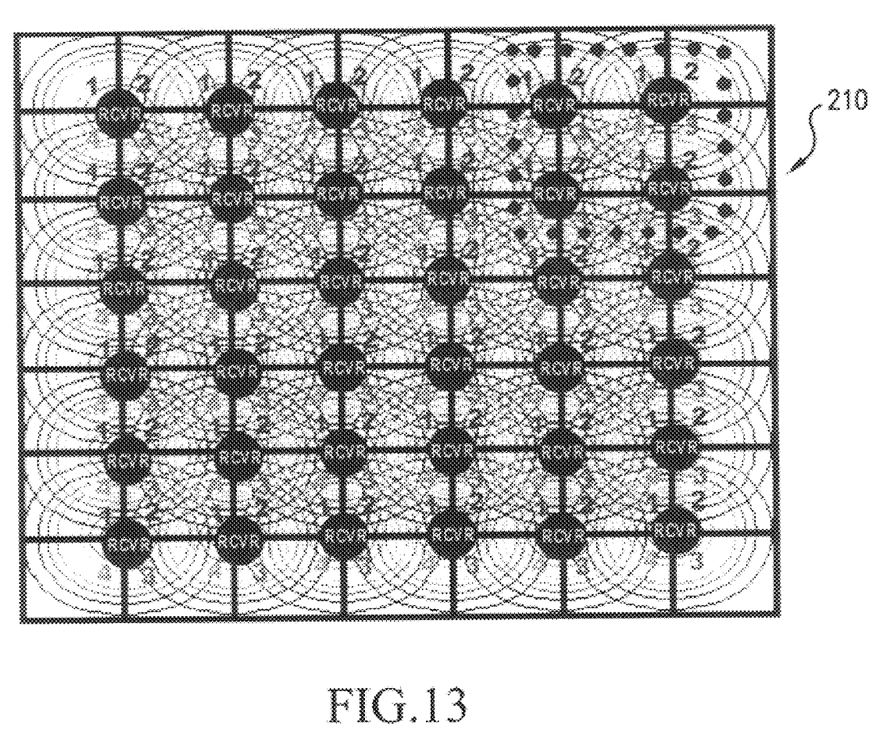
FIG. 13 is illustrative of a tiled architecture showing tile ports and receiver locations in a conventional antenna.
Figure 14:
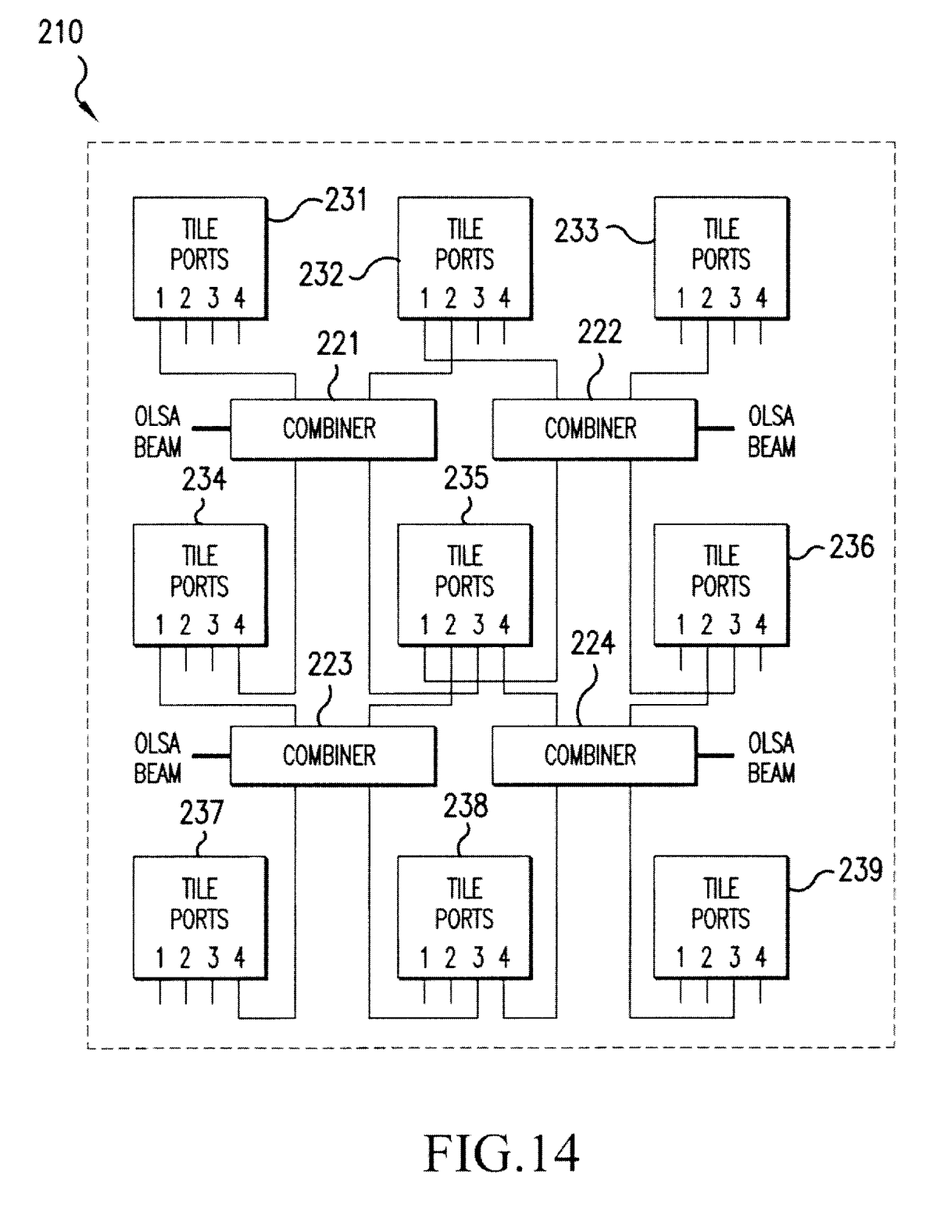
FIG. 14 is illustrative of an expanded view of FIG. 13 showing the physical interconnects among tiles.

Analog beamforming requires complicated and lossy manifolds with $N^2$ ports per antenna, where N is the number of OLSAs in each dimension. For example, four tiles feed data into a single receiver, and each tile feeds four receivers. The interdependence of the individual components in the analog OLSA architecture results in difficulties with channel equalization. Inaccessibility of the orthogonal beams that form the four parts of an OLSA hinders calibration and tightens manufacturing tolerances. FIGS. 13 and 14 show the complex physical interconnects necessary for analog beamforming in conventional systems.

Referring to FIG. 13, a typical 2D 2:1 OLSA is shown. The tile ports and receivers locations are superimposed over the OLSA architecture. Area 210 shows a portion of the antenna that includes four receivers and portions of nine tiles. FIG. 14 is a schematic view of area 210 that shows the physical interconnections among the tiles 231–239. Each tile 231–239 has four ports that correspond to a quadrant of the tile as shown in FIG. 13. Combiners 221–224 combine the outputs from the various tile ports to form OLSA beams as shown. For example, each combiner 221–224 receives is physically connected to four tile ports. Additionally, a tile 235 can be connected to four separate combiners 221–224, as shown. Those skilled in the art will appreciate that this configuration is repeated over the entire antenna, which leads to complex physical interconnections among adjacent tiles.

Figure 15:
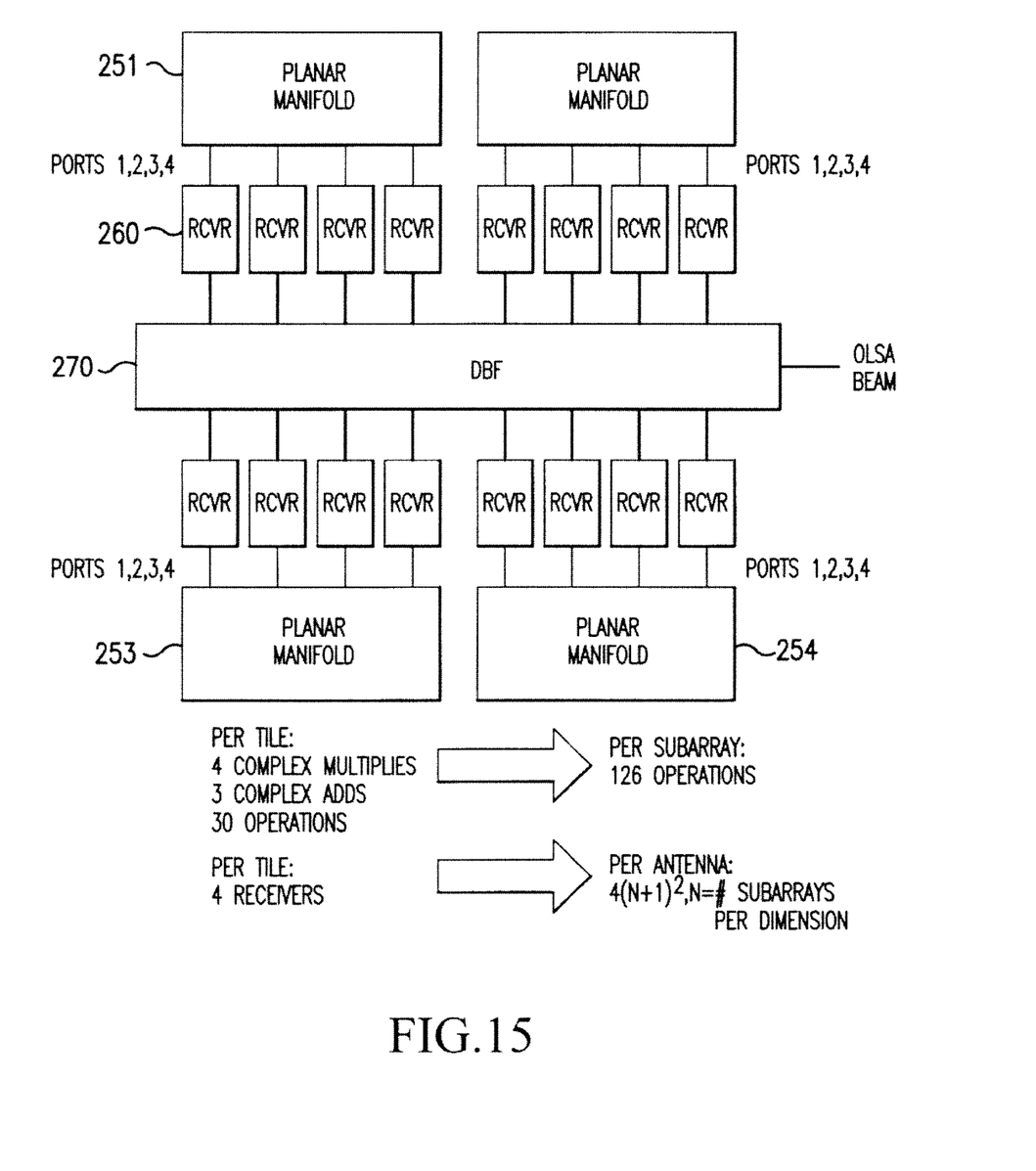
FIG. 15 is a block diagram of a conventional antenna four port per tile architecture.

FIG. 15 represents a conventional hardware configuration for digital beamforming in an OLSA antenna. Four manifolds 250 have four orthogonal ports each. However, in this case each orthogonal port is directly coupled to a receiver 260. The output from each port is converted to a digital signal. The ports from the four adjacent manifolds 250 can then be digitally combined in the digital beamforming unit 270 to form an OLSA beam. The digital beamforming requires $4(N+1)^2$ ports and $126N^2R$ FLOPs per antenna, where R is the data rate from the digital receivers. Although the physical interconnections are reduced when compared to the architecture of FIG. 14, digital beamforming still requires costly antenna hardware configurations and digital processing for implementation according to conventional systems.

Additionally, on transmit, the OLSA architecture produces a natural trapezoidal taper across an aperture. This taper leads to significant power loss and taper loss, reducing the effective radiated power of the antenna. Partial channels along the circumference of the aperture reduce these losses at the expense of extra hardware (i.e., manifolds and receivers for analog beamforming, receivers and processing for digital beamforming).

To reduce manufacturing costs, antenna element support members that incorporate multiple elements (such as tiles) have been developed recently. Mass production of tiles results in significant cost savings when identical tiles are utilized. Minimizing the number of ports (and therefore receivers) per tile reduces the total cost of a tiled antenna, just as minimizing the element count for a given aperture size reduces the total antenna cost for a traditional planar array.

SUMMARY

Accordingly, it is an object of the present invention to provide an improvement in tiled overlapping subarray antennas.

It is yet another object of the invention to provide an antenna that has a reduced number of ports and receivers per tile.

The foregoing and other objects are achieved by an array antenna comprising a plurality of tiles, each of which has two orthogonal ports and no physical interconnects to adjacent tiles. The array architecture also provides a plurality of receivers, each of which is individually coupled to orthogonal ports on said plurality of tiles. The array antenna includes a digital beamforming unit that receives outputs from said plurality of receivers and generates an overlapping subarray beam.

Additionally, the foregoing and other objects are achieved by a method for creating an antenna aperture with overlapped subarrays in two dimensions in an antenna comprised of a plurality of tiles. The method comprises: applying n phase offsets to a first port of a tile of the antenna thereby generating n beams, wherein n is an integer; adding said n beams to a second port of said tile thereby forming n partial overlapped subarrays; and combining n partial overlapped subarrays from n adjacent tiles to form one overlapped subarray.

Further scope of applicability of the present invention will become apparent from the detailed description provided hereinafter. It should be understood that, while disclosing the preferred embodiment of the invention, the detailed description and specific embodiments (e.g., n=4, square antenna comprised of 64 square tiles) are provided by way of illustration only. Various changes and modifications coming within the spirit and scope of the invention will become apparent to those skilled in the art from the detailed description which follows.

BRIEF DESCRIPTION OF THE DRAWINGS

The present invention will become more fully understood when the following detailed description is considered in conjunction with the accompanying drawings, which are provided by way of illustration only, and thus are not meant to be limitative of the present invention, and wherein.

DETAILED DESCRIPTION OF THE INVENTION

The examples described herein assume four-sided tiles arranged so that the number of subarrays in each dimension is the same. However, the invention is not limited to this design configuration. Those skilled in the art will appreciate that the invention can be practiced on other tile shapes and arrangements.

Figure 1:
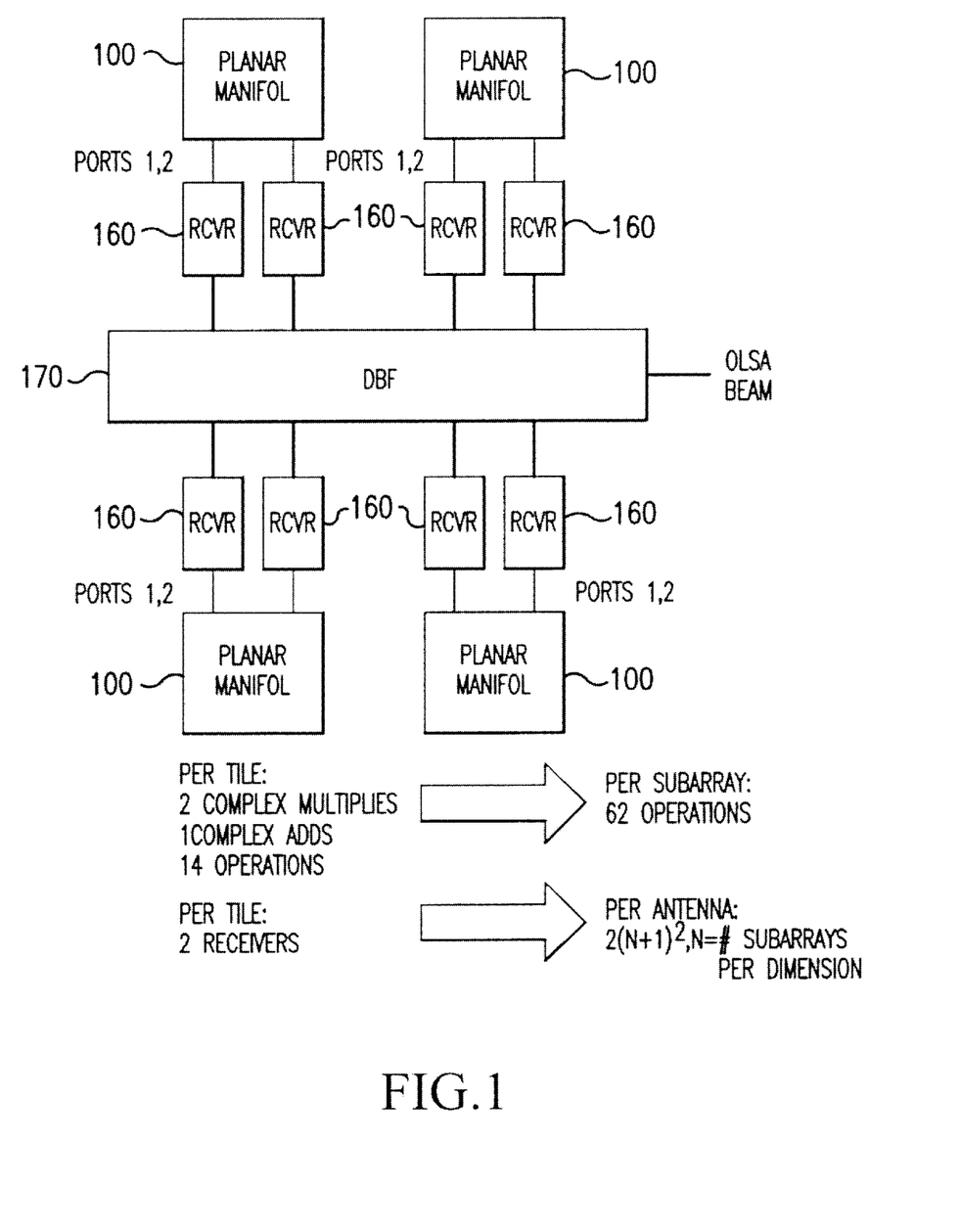
FIG. 1 is a block diagram of an antenna according to the present invention.

The antenna architecture of an embodiment of the present invention uses $2(N+1)^2$ ports per antenna (i.e., $(N+1)^2$ sum ports and $(N+1)^2$ circular monopulse ports), where N is the number of OLSAs in each dimension. The processing required for forming an overlapped subarray from the sum and circular monopulse ports of four adjacent tiles can be represented as a matrix equation given as:

$$[SA] = [\alpha_1 \alpha_2 \alpha_3 \alpha_4 \alpha_5 \alpha_6 \alpha_7 \alpha_8] \begin{bmatrix} \sum_{Tile\,1} \\ \circledA_{Tile\,1} \\ \sum_{Tile\,2} \\ \circledA_{Tile\,2} \\ \sum_{Tile\,3} \\ \circledA_{Tile\,3} \\ \sum_{Tile\,4} \\ \circledA_{Tile\,4} \end{bmatrix}$$

where: SA=the complex distribution of an individual subarray
α=the complex multiplicative constant digitally applied to tile outputs
Σ=the sum port output from a tile
Ⓐ=the circular monopulse port output from a tile FIG. 1 shows a block diagram of the hardware and processing architecture according to the present invention. Specifically, assuming four-sided tiles, the digital creation of an overlapping subarray from four adjacent tiles with a sum and circular monopulse port is shown. Each of the four individual tile manifolds 100 has two orthogonal ports, a sum port and a circular monopulse port. Each orthogonal port is directly coupled to a receiver 160. The output from each port is converted to a digital signal. The ports from the four adjacent manifolds 100 can then be digitally combined in the digital beamforming unit 170 to form an OLSA beam.

Each tile 100 in the antenna is comprised of a series of traditional Lopez manifolds. The Lopez manifold is described in an article by Lopez, A., "Monopulse Networks for Series Feeding an Array Antenna", IEEE Transactions on Antennas and Propagation, vol. AP-16 no 4, July 1968, pages 436–440, which is hereby incorporated by reference in its entirety. This design provides a series network for feeding an array antenna. The Lopez manifold advantageously provides for independent control of the sum and delta (i.e., difference) excitations. Further, the Lopez design provides physical symmetry and a low loss network. All of these features are desirable monopulse characteristics, which are useful in the present invention.

Figure 2:
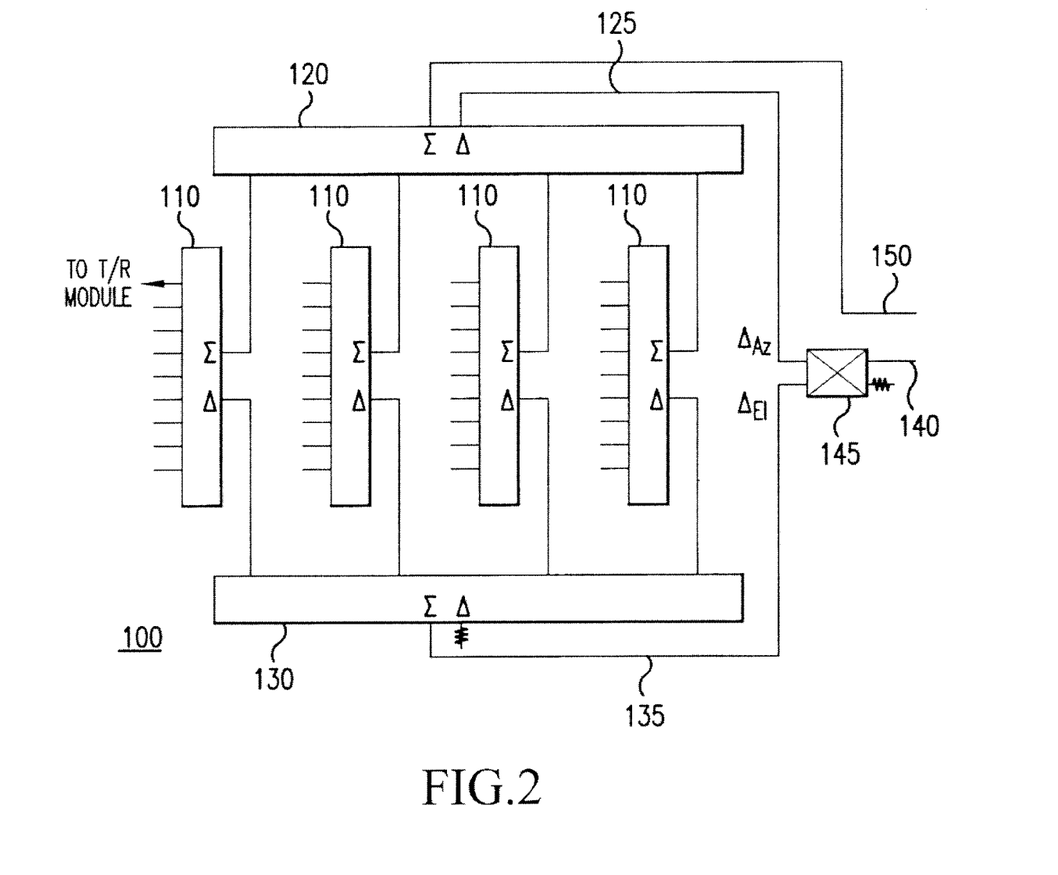
FIG. 2 is illustrative of a block diagram of a tile configuration.

FIG. 2 shows a block diagram of a tile 100 according to the present invention. A series of Lopez manifolds 110 are oriented in the elevation direction, which generates Sum (Σ) and elevation Delta (Δ) ports. These ports are then combined in the azimuth direction via Lopez manifold 120 to form a total Sum 150 and Azimuth delta 125 beam. Adding the Elevation delta 135 from Lopez manifold 130 with the Azimuth delta 135 in phase quadrature using a 3dB-hybrid. coupler 145 forms the circular monopulse beam 140.

Since the present invention uses orthogonal ports from planar manifolds as elements, conventional calibration procedures and channel equalization techniques for planar manifolds easily apply to this architecture. Effective calibration steps simply comprise: 1) remove errors in the primary line of the manifold by tuning the sum beam; and 2) use the monopulse calibration port to correct phase and amplitude errors between the sum beam and any orthogonal beam (e.g., the circular monopulse is an orthogonal beam to sum). A digital signal processor (not shown) can resolve any channel mismatch not corrected in the planar manifold.

The present invention reduces the processing requirements for array antenna configurations, when compared to similar conventional designs of array antenna configurations, as described above. According to the above-described embodiment of the present invention, each subarray requires eight complex multiplies and seven complex adds. Each complex multiply requires four multiplies and two adds; each complex add requires two adds. Therefore, the total number of computations per subarray is sixty-two (thirty-two multiplies and thirty adds). Digital processing for the antenna uses $62N^2R$ floating point operations (FLOPs), where R is the data rate from the digital receiver and N is the number of overlapped subarrays per dimension in the antenna. As noted above, the conventional approach uses four ports per tile to generate a 2D 2:1 OLSA antenna and requires $126N^2R$ FLOPs per antenna. Thus, the antenna architecture of the present invention demonstrates a greater than 2:1 reduction in processing load and a 2:1 reduction in hardware over conventional antenna designs.

Figure 3A:
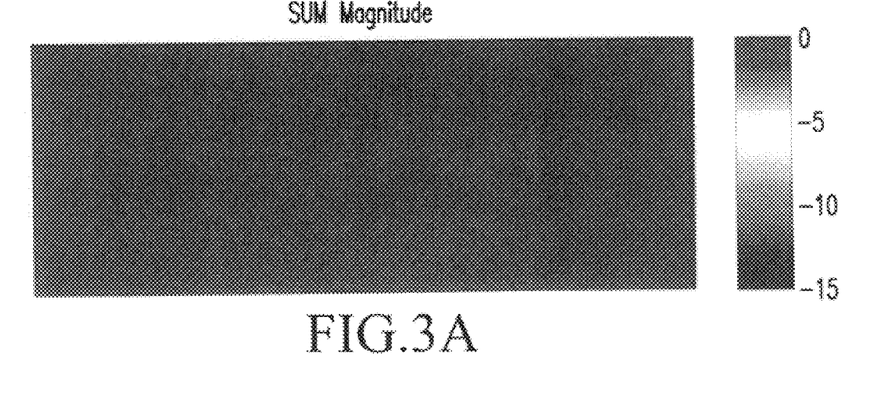
FIGS. 3A–C are graphs of the responses from the sum and difference outputs from each tile.
Figure 3B:
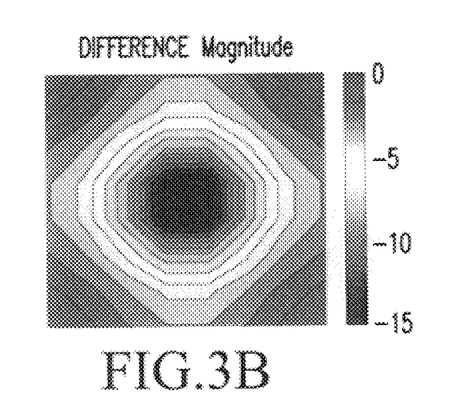
Figure 3C:
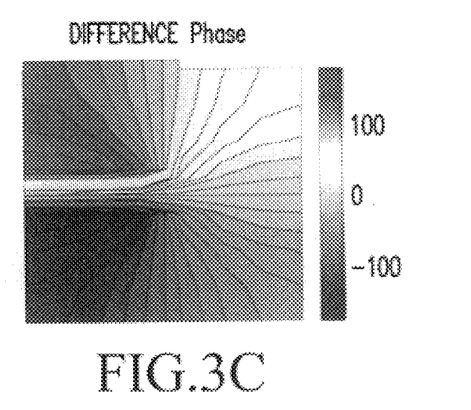
Figure 4A:
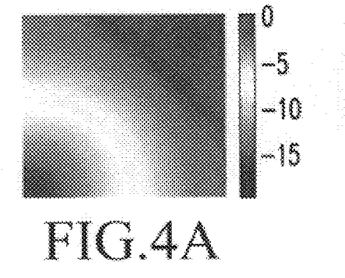
FIGS. 4A–D are illustrative of the magnitude of four beams formed from the two ports.
Figure 4B:
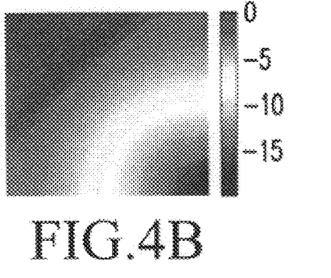
Figure 4C:
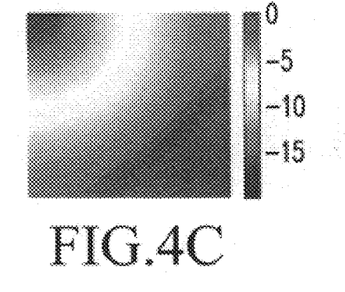
Figure 4D:
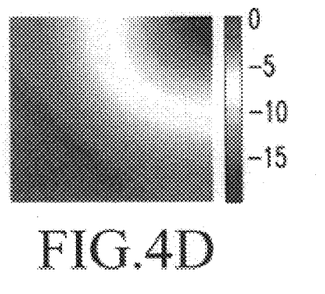
Figure 4E:
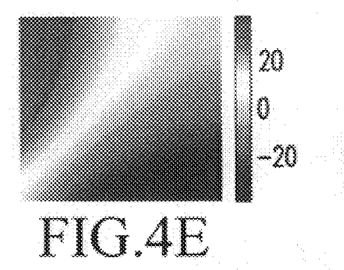
FIGS. 4E–H are illustrative of the phase of four beams formed from the two ports.
Figure 4F:
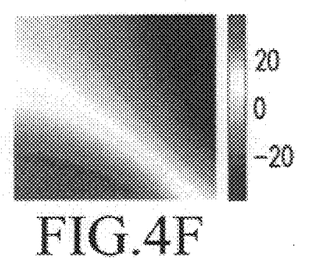
Figure 4G:
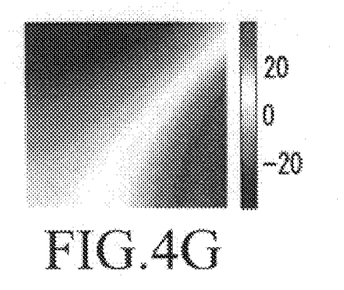
Figure 4H:
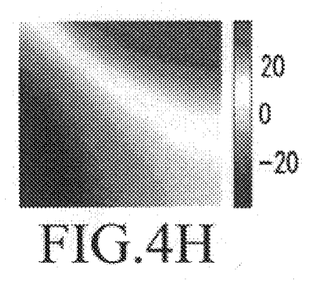

The illumination functions are shown in FIGS. 3A–C. FIG. 3A shows the magnitude of the sum port. The sum port output provides a uniform illumination in terms of magnitude, as shown in FIG. 3A. The magnitude and phase of the circular monopulse port output is shown in FIGS. 3B and 3C, respectively. The circular monopulse port has a donut shaped illumination in magnitude and a rotating phase, as shown in the figures. This is a result of adding the azimuth delta and elevation delta beams in phase quadrature, as shown FIG. 2.

Figure 5A:
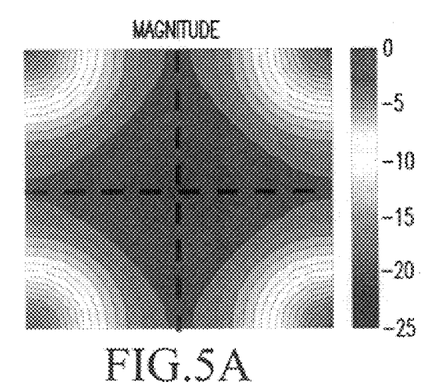
FIG. 5A is an illustration the magnitude of an overlapped subarray formed digitally from the beams of four adjacent tiles.
Figure 5B:
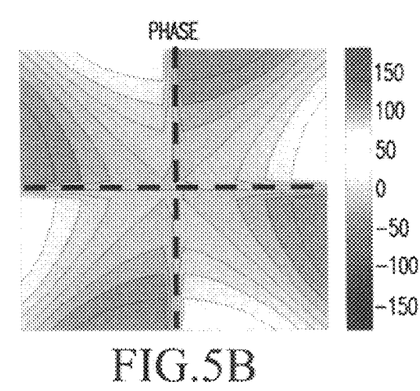
FIG. 5B is an illustration the phase of an overlapped subarray formed digitally from the beams of four adjacent tiles.

For the described embodiment of the present invention, a digital processor applies phase offsets of 45°, 135°, −135°, and −45° to the circular monopulse port. Four beams result from this operation. These four beams are added to the sum port thereby forming quarter overlapped subarrays. The magnitude and phase of these quarter overlapped subarrays are shown in FIGS. 4A–H, respectively. Then, beams from four adjacent tiles are digitally combined to form one overlapped subarray, as shown in FIGS. 5A and 5B. The dotted lines in FIG. 5B mark the tile borders of the four adjacent tiles used to form the OLSA.

Figure 6A:
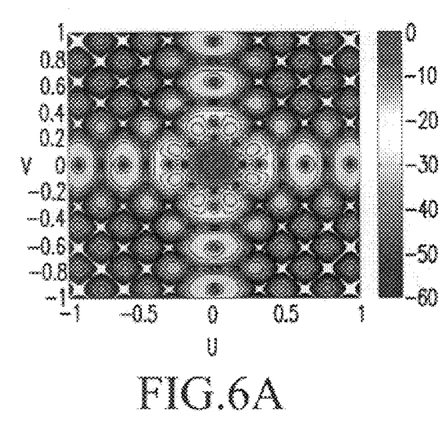
FIG. 6A is an illustration of the far field pattern of the overlapped subarray.
Figure 6B:
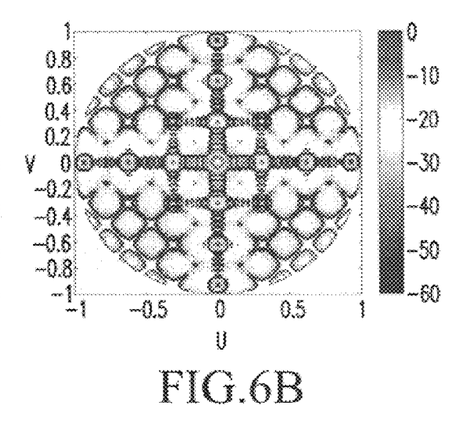
FIG. 6B is an illustration of the far field pattern of the overlapped subarray of FIG. 6A superimposed on the antenna pattern.

The far-field pattern of an overlapped subarray is an envelope to the antenna pattern. Also, the far-field pattern determines the level to which grating lobes and sidelobes will rise. The far-field pattern of the overlapped subarray according to the present invention is shown in FIG. 6A. FIG. 6B is a far-field pattern of the overlapped subarray superimposed on the antenna pattern, showing the "envelope" formed by the subarray pattern around the antenna pattern.

Figure 7:
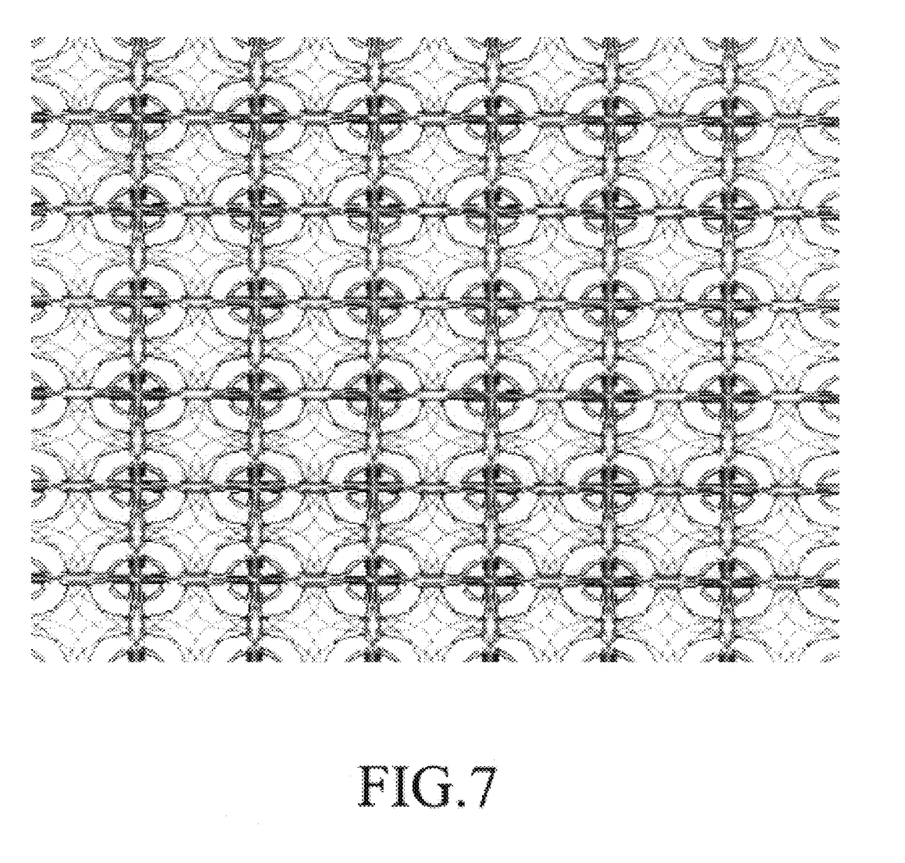
FIG. 7 is illustrative of the magnitude of tile illuminations showing overlapped subarrays.

As described above, each tile contributes to four subarrays. The antenna is comprised of tiles arranged in a grid, which produces an overlapped subarray configuration. Partial subarrays along the edges of the antenna can be realized with no additional hardware to reduce power loss and taper loss on transmit and receive. In FIG. 7, the overlapped subarrays are shown by the magnitude of tile illuminations.

Figure 8A:
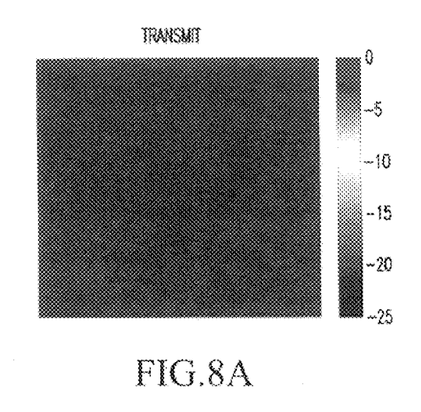
FIG. 8A is illustrative of transmit aperture illuminations.
Figure 8B:
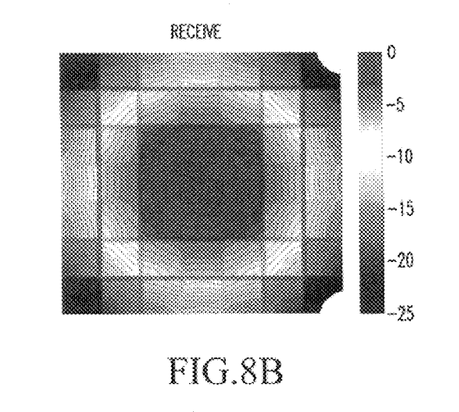
FIG. 8B is illustrative of receive aperture illuminations.

A digital signal processor can apply weighting functions for sidelobe control and time delay compensation for instantaneous bandwidth. Overlapped subarray weights are summed at the element level to produce aperture illuminations that maximize radiated power for transmit and minimize sidelobes for receive. Across the aperture, the result is a uniform illumination for transmit and a tapered illumination for receive, as seen in FIGS. 8A and 8B, respectively. The weighting functions for transmit and receive are independent of the hardware design and therefore can be changed dynamically in the digital processor for different mission requirements, as will be appreciated by those skilled in the art.

An OLSA antenna according to the present invention eliminates the trapezoidal taper inherent to the OLSA architecture with no impact on hardware or processing requirements. Uniform illumination on the sum beam maximizes effective radiated power (ERP) for the transmit aperture while the subarray pattern constrains the grating lobes for wideband applications.

Figure 9:
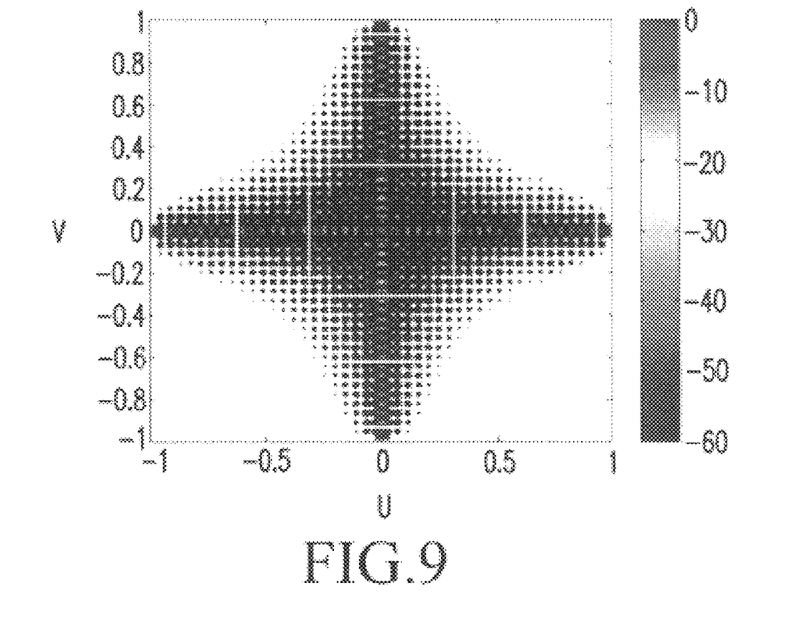
FIG. 9 is illustrative of the far-field antenna pattern of the transmit aperture.
Figure 10:
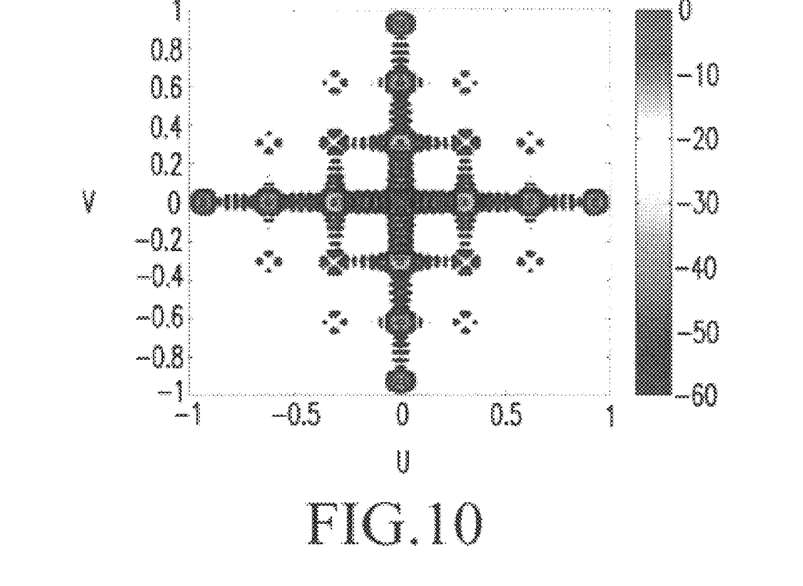
FIG. 10 is illustrative of the far-field antenna pattern of the receive aperture.
Figure 11A:
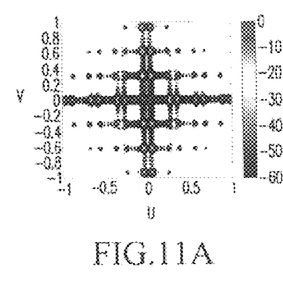
FIGS. 11A–C is illustrative of the far-field antenna patterns of the delta azimuth, delta elevation, and delta delta aperture distributions, respectively.
Figure 11B:
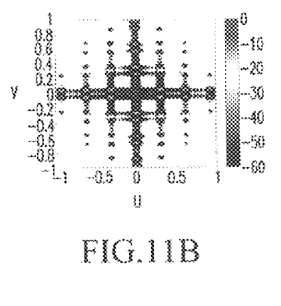
Figure 11C:
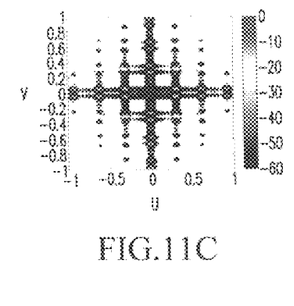

The far-field antenna patterns produced by the transmit aperture have sinx/x sidelobes in the principal planes as shown in FIG. 9. The far-field antenna pattern of the receive aperture (sum beam) has a peak sidelobe of −30dB, as seen in FIG. 10. The peak sidelobe occurs at a grating lobe location, due to the spacing between adjacent overlapped subarrays. Adjusting the digital taper across overlapped subarrays controls close-in sidelobes. Applying low sidelobe difference weights in azimuth, elevation, or both produces delta azimuth, delta elevation and delta delta aperture distributions, respectively. The resulting low-sidelobe monopulse patterns are shown in FIGS. 11A–C. FIG. 11A shows the far-field pattern of the delta azimuth aperture distribution. FIG. 11B shows the far-field pattern of the delta elevation and FIG. 11C shows the far-field pattern of the delta delta aperture distributions applied digitally in the processor.

Although, the invention has been described in terms of a four sided tile, the invention is not limited to this shape of tile. The invention provides 2D 2:1 OLSA architecture for all tile shapes (e.g., four-sided, six-sided, etc.), wherein the number of ports per tile remains two. The lack of physical interconnects among the composite tiles of an antenna and dynamic digital aperture tapers permits application to conformal architectures, such as curved or other nonlinear surfaces. Additionally, the two dimensional nature of both the OLSA architecture and the tile structure of the antenna provides a building block for modular scaleable arrays in two dimensions.

Additionally, those skilled in the art will appreciate methods for creating an antenna aperture with overlapped subarrays in two dimensions in an antenna having a plurality of tiles are disclosed from the foregoing description. An exemplary method comprises: 1) digitally applying n phase offsets to a first port of a tile of the antenna (the circular monopulse port) thereby generating n beams, where n is the number of tiles combined to form one overlapped subarray (Note: If the tile and antenna are isomorphic, geometry dictates that either n=4 for square, rectangular, diamond or rhombic tiles or n=6 for hexagonal tiles). All other ns will generate ridged antenna shapes and/or require two or more unique tiles to form a smooth-edged antenna); 2) digitally adding said n beams to a second port of said tile (the sum port) thereby forming n partial overlapped subarrays; 3) digitally combining n partial overlapped subarrays from n adjacent tiles to form one overlapped subarray.

Accordingly, the foregoing detailed description merely illustrates the principles of the invention. It will thus be appreciated that those skilled in the art will be able to devise various arrangements which, although not explicitly described or shown herein, embody the principles of the invention and are thus within its spirit and scope. Therefore, the scope of the invention is not limited by the foregoing description but is defined solely by the appended claims.

What is claimed is:

1. An antenna array, comprising:

a plurality of tiles having no physical interconnects among adjacent tiles, wherein each tile has two orthogonal ports;

a plurality of receivers, wherein each receiver is individually coupled to orthogonal ports on said plurality of tiles; and a digital beamforming unit that receives outputs from said plurality of receivers and generates an overlapping subarray beam.

2. The antenna array as defined by claim 1, wherein said tiles are of a predetermined size and shape.

3. The antenna array as defined by claim 2, wherein said tiles have substantially linear side edges.

4. The antenna array as defined by claim 2, wherein said tiles have a plurality of side edges that form a geometrical figure.

5. The antenna array as defined by claim 1, wherein said two orthogonal ports are independent and orthogonal with respect to each other.

6. The antenna array as defined by claim 1, wherein said two orthogonal ports are a sum port and a circular monopulse port, respectively.

7. The antenna array as defined by claim 6, wherein said digital beamforming unit applies to the circular monopulse port necessary phase offsets to steer respective beams to corners of the tile and adds resulting beams to the sum port.

8. The antenna array as defined by claim 1, wherein said digital beamforming unit uses n adjacent tiles in the antenna to generate the overlapping subarray beam, where n=the number of tiles combined to form one OLSA and the number of sides on a particular tile.

9. The antenna array as defined by claim 8, wherein n is 4.

10. The antenna array as defined by claim 8, wherein n is 6.

11. The antenna array as defined by claim 1, wherein said digital beamforming unit applies to a first port of said two orthogonal ports necessary phase offsets to steer respective beams to corners of the tile and adds the resulting beams to a second port of said two orthogonal ports.

12. A method for creating an antenna aperture with overlapped subarrays in two dimensions in an antenna comprised of a plurality of tiles:

applying n phase offsets to a first port of a tile of the antenna thereby generating n beams, wherein n is an integer;

adding said n beams to a second port of said tile thereby forming n partial overlapped subarrays; and combining n partial overlapped subarrays from n adjacent tiles to form one overlapped subarray.

13. The method of claim 12, wherein there is no physical interconnects among said adjacent tiles.

14. The method of claim 12, wherein said first port is a circular monopulse port and said second port is a sum port.

15. The method of claim 12, wherein said first and second ports are independent and orthogonal with respect to each other.

16. The method of claim 12, wherein n is 4.

17. The method of claim 12, wherein n is 6.

* * * * *